United States Patent [19]

Grant

[11] 4,047,625

[45] Sept. 13, 1977

[54] GRAVITY ROLLER CONVEYORS

[76] Inventor: Willson Barrat David Grant, Quappell, Little Frieth, Henley-on-Thames, Oxfordshire, England

[21] Appl. No.: 634,279

[22] Filed: Nov. 21, 1975

Related U.S. Application Data

[63] Continuation-in-part of Ser. No. 472,046, May 21, 1974, abandoned.

[51] Int. Cl.² .......................... B66F 9/06; B65G 47/00
[52] U.S. Cl. .......................... 214/95 R; 193/35 MD; 198/485
[58] Field of Search .......... 214/1 D, 1 SW, 16.1 DA, 214/16.4 A, 11 R, 95 R, 713, 701 R, 715; 193/35 R, 35 MD, 35 SS, 36; 198/127 R, 21, 24, 26, 787, 485

[56] References Cited

U.S. PATENT DOCUMENTS

| 1,525,870 | 2/1925 | Lee ........................................ 198/474 |
| 1,708,761 | 4/1929 | Horbath ............................ 214/1 SW |
| 1,849,385 | 3/1932 | Sekulski ................................ 214/95 |
| 1,877,934 | 9/1932 | Milbrath ................................ 198/474 |
| 1,949,964 | 3/1934 | Keller et al. ......................... 198/467 |
| 2,368,192 | 1/1945 | Bishop et al. ......................... 214/1 D |
| 2,548,767 | 4/1951 | Brest ........................................ 214/89 |
| 3,011,665 | 12/1961 | Wise ........................................ 214/84 |
| 3,361,280 | 1/1968 | Traver ............................... 214/1 SW |
| 3,583,588 | 6/1971 | Royal, Sr. ............................. 214/713 |

FOREIGN PATENT DOCUMENTS

| 1,059,096 | 2/1967 | United Kingdom ........... 214/16.4 A |

*Primary Examiner*—Lawrence J. Oresky
*Attorney, Agent, or Firm*—Lawrence J. Winter

[57] ABSTRACT

A platform for supporting the load and adapted in use to be inclined to the horizontal at one angle at the infeed position and inclined to the horizontal at another angle at the discharge position; it is provided with an apparatus for changing the inclination of the platform during its elevation from the infeed position to the discharge position with a low friction surface on the platform and provided by ball castors. A pneumatic ram for elevating the platform and load from the infeed position to the discharge position and for lowering the platform from the discharge position to the infeed position is provided with the pneumatic ram being attached to the platform by the cooperation of a ball carried on the ram and a ball socket on the underside of said platform. It has a device preventing infeed of a load other than when the platform is in the infeed position; and apparatus preventing discharge of a load other than when the platform is in the discharge position.

9 Claims, 17 Drawing Figures

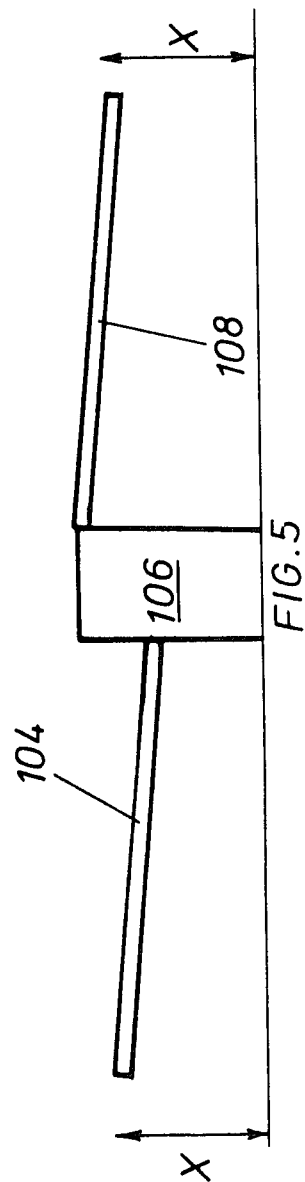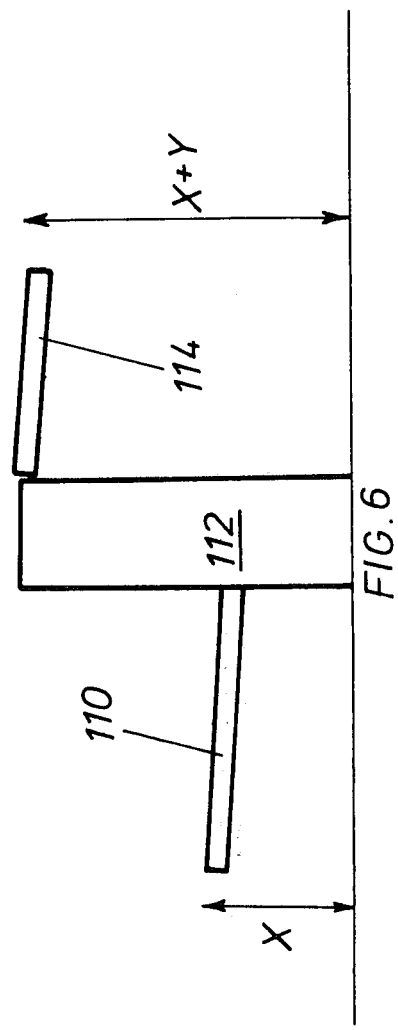

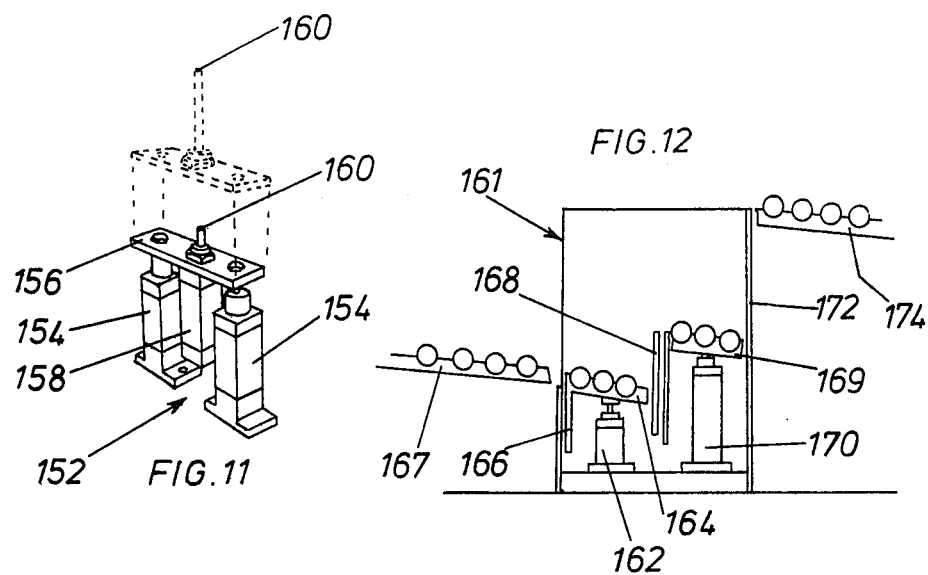
FIG. 11
FIG. 12
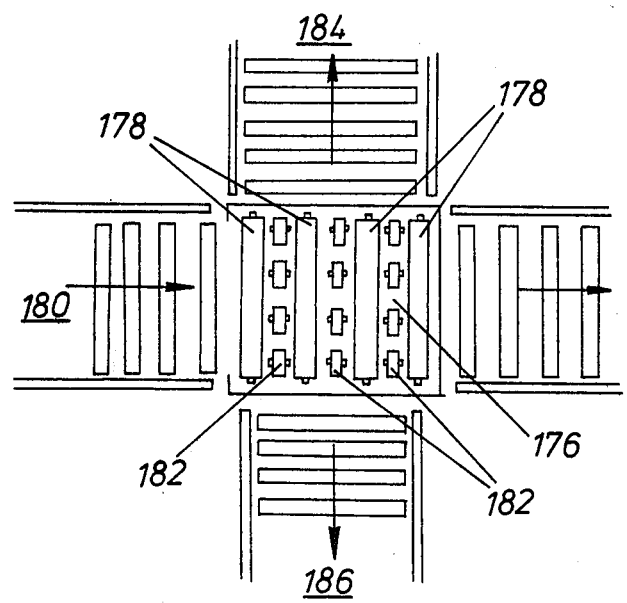
FIG. 13

GRAVITY ROLLER CONVEYORS

The invention relates to mechanical handling equipment, and particularly to elevators suitable for inclusion in gravity roller conveyors. This invention is a continuation-in-part of application Ser. No. 472,046 filed May 21, 1974 now abandonded.

The invention provides an elevator comprising a platform elevatable and lowerable between a feed position and a discharge position and having a low friction surface inclinable to the horizontal about at least two non-parallel axes for allowing a load on the platform to discharge, means for preventing the load on the platform from discharging other than at the discharge position, and means for preventing a further load from being fed into the elevator when the platform is displaced from the feed position.

Elevators according to the invention are especially suitable for use with gravity roller sections to provide gravity roller conveyors, the functions of which include the transport of loads from an initial point to a second point which may be higher than, at the same level as, or lower than the initial point, the transport of loads around bends, the division of loads from a single stream into two or more streams, the accumulation of loads along a gravity roller section and the separate loading of work to machines. The elevators are also suitable for use in conjunction with sections of other forms of conveyors, alone or with gravity roller sections, to provide further functions. For example, the spacing of loads may be achieved by feeding the loads into the elevator from a gravity roller section and discharging the loads from the elevator to a powered belt section.

The platform is preferably elevatable and lowerable by a pneumatic ram, but other means of elevating and lowering the platform may be employed, such as a hydraulic ram or an electric motor driving a screwjack or a geared chain.

Platforms of elevators according to the invention may be aligned with the infeed gravity roller section to take on a load, and tilted during elevation to allow the load to be discharged in a direction other than that of the infeed. As the load is required to move in more than one direction on the platform, rollers are not suitable for providing a low friction surface, and a convenient way to provide such a surface is by the use of ball castors. More preferable, however, are multi-directional wheels. If the discharge direction(s) is or are to be at right angles to the infeed direction, it is most preferable to use a platform having an upper part on which rollers are mounted in the infeed direction, and a lower part on which wheels are mounted at right angles to the rollers, the upper and lower parts being secured together by springs such that when the springs are uncompressed the rollers provide a first low friction surface and when the springs are compressed the wheels project through the spaces between the rollers and provide a second low friction surface at right angles to the first low friction surface. Such a platform is hereinafter referred to as a double platform. A rigid attachment for the ram or other elevating an lowering means is not suitable, and the preferred form of attachment is by a ball carried on the ram or other elevating and lowering means and cooperating with a recessed or mounted ball socket in or on the underside of the platform, or, if a double platform is being used, to the underside of the lower part of the platform. The ball socket may be central with respect to the platform or may be offset from the center of the platform.

In a suitable arrangement for the tilting of an inclinable platform one end of an anchor cord or wire is attached to the underside of the platform, or, if a double platform is being used, to the underside of the upper part of the platform, and the other end of the anchor cord or wire is attached to the ram or a small pneumatic, hydraulic or otherwise operable cylinder. The stable inclination of the platform is maintained as that of the infeed gravity roller by the action of one or more springs if the ball socket mounting the platform on the ram or other elevating and lowering means is central with respect to the platform, or by the action of gravity, optionally assisted by one or more springs, if the ball socket is offset from the centre of the platform. The anchor cord or wire is of such length that when the ram to which one end is attached is extended the platform may rise to its discharge position without the anchor cord or wire becoming taut, but when the ram is withdrawn the anchor cord or wire becomes taut during the elevation of the platform, causing the platform to tilt by pivoting about its ball and socket joint with the elevating and lowering means, and, if a double platform is being used, further causing the springs securing together the upper and lower parts to be compressed so that the wheels on the lower part provide the low friction surface. Suitable positioning of the attachment to the underside of the platform will enable it to tilt in the desired direction.

Such an arrangement will allow a load to be discharged in either of two directions, one the same as and one different from the infeed direction. The addition of further anchor cords or wires enables a load to be discharged in additional directions, each different from the infeed direction. Should only one discharge position be desired, and that in a direction different from the infeed position, the small cylinder and ram to which the appropriate end of the anchor cord or wire is attached may be omitted, and that end of the anchor cord or wire attached to a fixed point, leaving a length of the cord or wire sufficient to tilt the platform when it is in the discharge position. In each of these arrangements, whether with one or more ram and cylinder anchored cords or wires or with one fixed anchored cord or wire, the platform will return to its stable infeed inclination when lowered, and is thus ready for the next load.

Operation of the ram may be controlled by an automatic sensor switch or by a manual switch. Alternatively the tilting of the platform may simply be effected by movement of a manually operable lever, to which the lower end of the anchor cord or wire is attached, so as to alter the effective length of the anchor cord or wire.

In place of the ram and cord or wire device for tilting the platform, it may be preferably to use a rigid rod attached to the platform or to the upper part of a double platform by a pivotal mounting, such as ball and socket mounting, passing through a bearing, and having a retaining collar, the position of which is adjustable, below the bearing. Operation of such a device is similar to operation of the ram and cord or wire device, the effective length being adjustable by adjusting the position of the retaining collar which stops the platform rising if it strikes the bearing. The bearing may conveniently be mounted on any strong, fixed part of the elevator below the infeed position.

It is, of course, necessary to prevent a load on the low friction surface of the platform from rolling off other than at the discharge position. To this end the elevator is preferably equipped with a housing extending at least between the feed position and the discharge position, so that a load is retained on the platform by the housing until the former has reached the discharge position. More preferably the housing should be extended downwardly to cover the elevating and lowering means, so that greater safety may be obtained by leaving no finger traps. It is sometimes desirable, however, to operate a conveyor system at a level well above the floor, and in this case a skirt dependent from each discharge gravity roller section would be sufficient to replace the housing.

The elevators may be wall-mounted for use in high level conveyor systems.

It is also necessary to prevent a load from being fed into the elevator when the platform is displaced from the feed position. A skirt elevatable and lowerable with the platform is one of a number of means whereby this may be achieved. Then, when the platform starts to rise the skirt also rises to close off the elevator from further waiting loads. The skirt may be elevatable and lowerable by means independent of those for elevating and lowering the platform, or, more conveniently, may be dependent on the platform.

Operation of the elevator may be made automatic by the inclusion of sensors, which may be of any form, for example photocells, ultrasonics- or micro-switches, or pneumatic pilot valves, but are preferably pneumatic pilot valves controlling the supply of air to the preferred pneumatic ram elevating and lowering means. A sensor is preferably provided on the platform to prevent the platform from rising until a load is in position on the platform. A second sensor is preferably provided on each discharge roller section to actuate lowering of the platform when the load has been adequately discharged. With such sensors included, the platform will rise only when loaded, and will lower only when safely unloaded.

A disadvantage of using a single ram to elevate and lower the platform arises if the distance between the infeed and discharge positions is greater than that between the floor and the infeed position. Then in order to provide the desired lift the ram would have to be countersunk into the floor. Two alternative arrangements are however available to overcome this disadvantage. In the first arrangement a pair of rams bodily raise a third ram which is attached to the platform. The platform is thus raised by an amount equal to the stroke of the pair of rams, and may be further raised by the extension of the third ram. In the second arrangement, a load is fed onto a first fixed inclination platform, raised to a discharged position, and discharged onto a second platform, which is then raised to its discharge position and discharges the load onto a gravity roller section. It will be appreciated that either of these arrangements may be extended, in the first case by further rams bodily to lift the pair of rams which raise the ram to which the platform is attached, and in the second case by simply adding more intermediate platforms.

The invention will now be illustrated with reference to the drawings of which:

FIGS. 5 to 7 are diagrammatic elevations of gravity roller conveyors including elevators according to the invention;

FIG. 11 is a perspective view of an arrangement of rams for elevating and lowering a platform of an elevator according to the invention;

FIG. 12 is a diagrammatic sectional elevation of a further arrangement of rams for elevating and lowering a platform of an elevator according to the invention;

FIG. 13 is a plan view of a further elevator according to the invention, and shows an infeed and three discharge gravity roller sections attached to the elevator;

Figure 16:
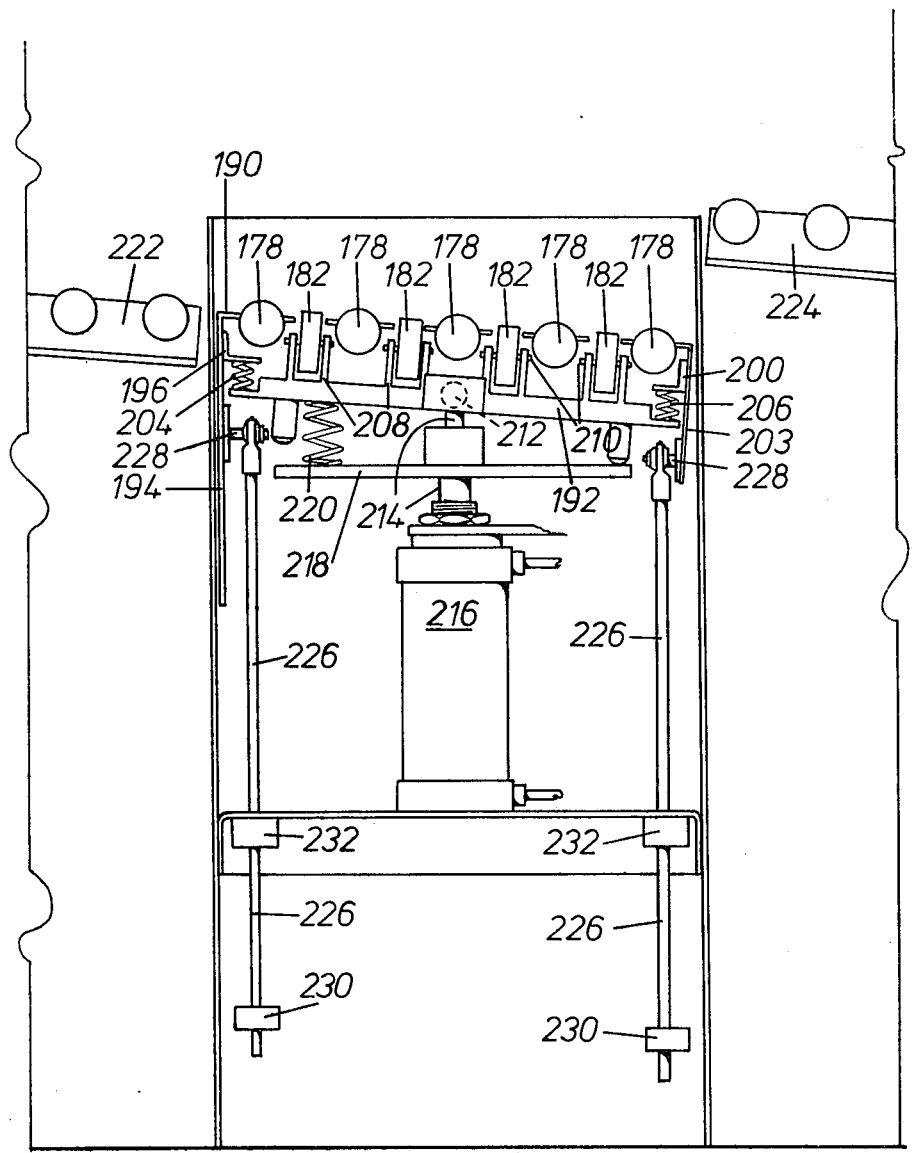
Figure 17:
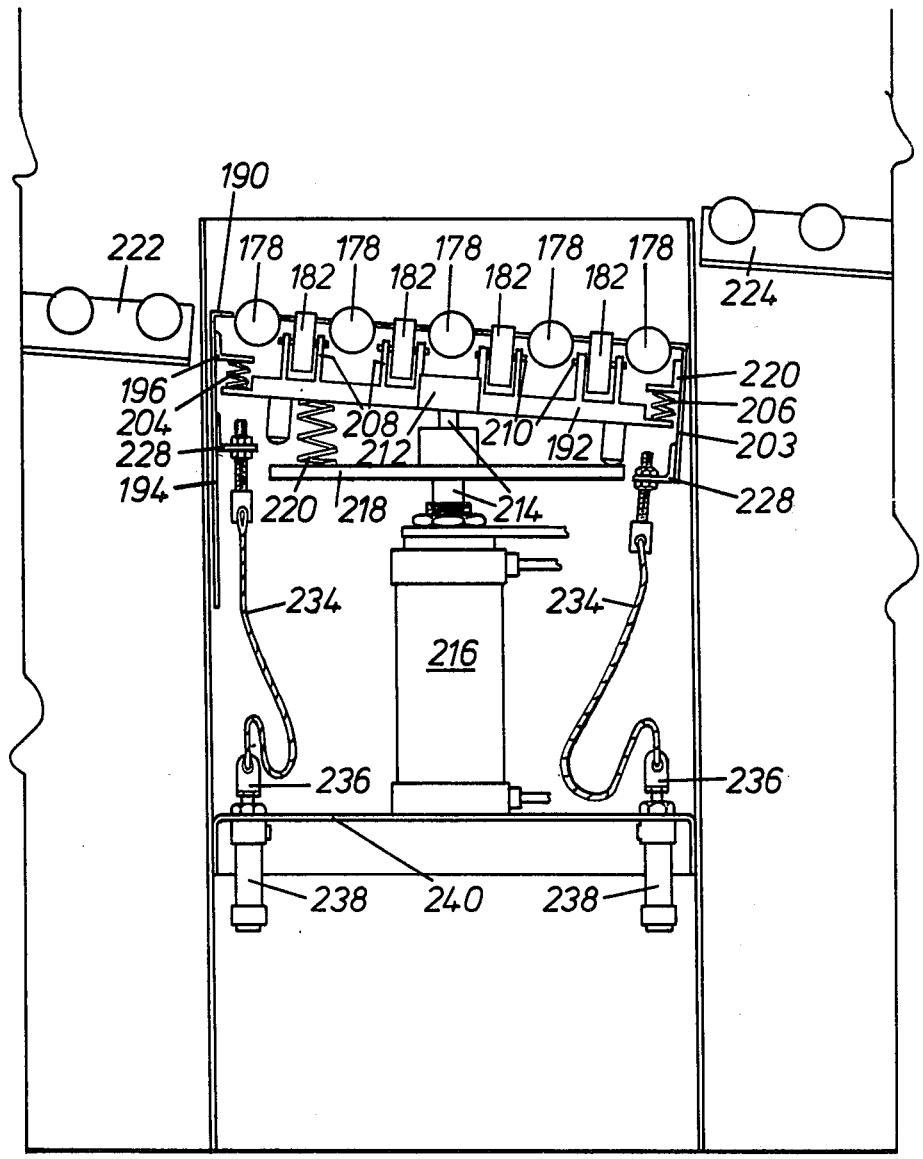

FIG. 16 is a sectional side elevation of a further elevator according to the invention, the elevator having a double platform and rigid rod tilting mechanism, and several parts being omitted for clarity; and FIG. 17 is a sectional side elevation of yet a further elevator according to the invention, the elevator having a double platform and an anchored cord tilting mechanism, and several parts being omitted for clarity.

Figure 1:
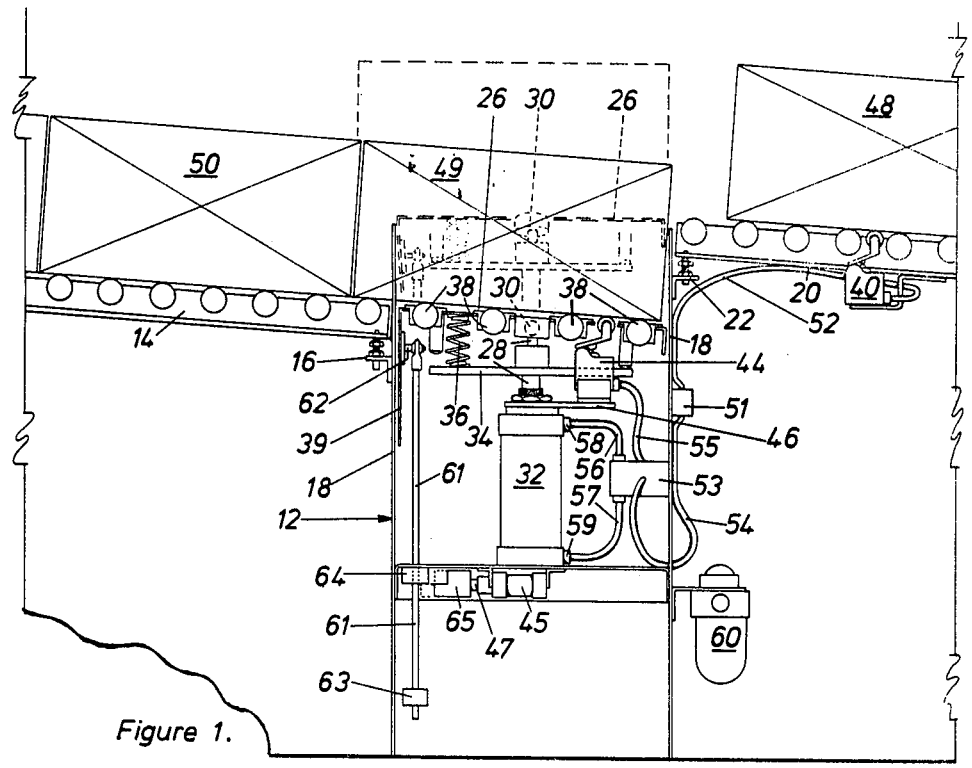
FIG. 1 is a sectional side elevation of an elevator according to the invention and shows an infeed gravity roller section and a first discharge gravity roller section attached to the elevator, a second discharge gravity roller section at 90° to the infeed and first discharge gravity roller sections being hidden by the elevator.
Figure 2:
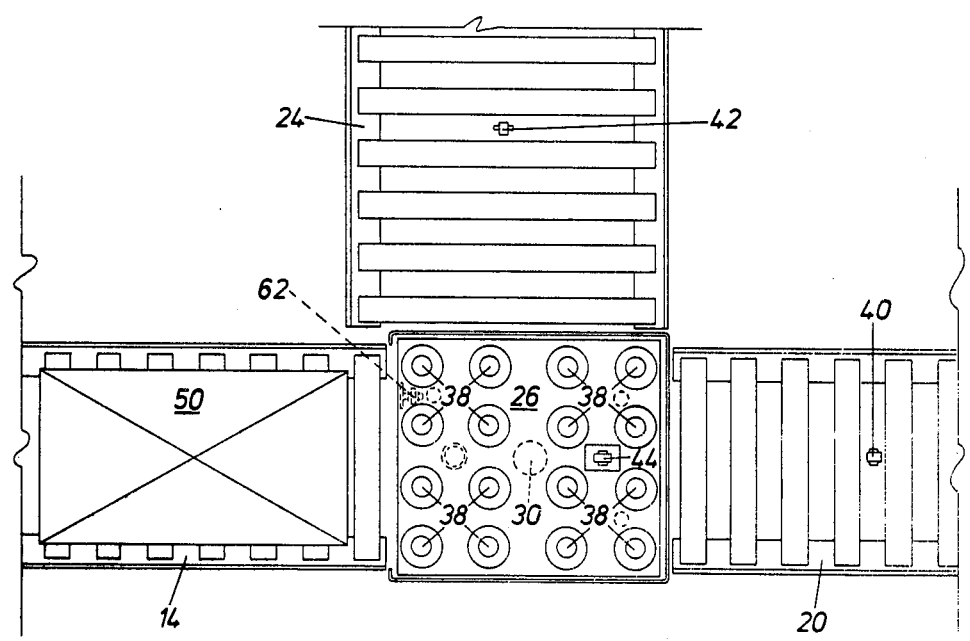
FIG. 2 is a plan view of the elevator and gravity roller sections of FIG. 1.

With reference to FIGS. 1 and 2, there is shown an elevator generally indicated 12 provided with an infeed gravity roller section 14 bolted to a flange 16 extending from a housing 18 of the elevator, a first discharge gravity roller section 20 bolted to a flange 22 extending from the housing 28 and a second discharge gravity roller section 24 similarly secured to the housing 28.

The elevator 2 has a platform 26, shown in full lines at the infeed position and in broken lines in position to discharge to the second discharge gravity roller section 24. The platform 26 is connected to a pneumatic ram 18 by a ball and socket joint 30 and is thus elevatable and lowerable by reciprocation of the pneumatic ram 18 in an air cylinder 32. The pneumatic ram 18 also carries plate 34 to which the platform 26 is connected by a spring 36. The stable inclination of the platform 26 is that shown in full lines with the spring 36 uncompressed, and is the same as the inclination of the infeed gravity roller section 14 and the first discharge gravity roller section 20. The inclination of the platform 26 when the spring 36 is compressed, as shown in broken lines, is that of the second discharge gravity roller section 24. The platform 26 has a low friction surface provided by ball castors 38. A skirt 39 depends from the platform 26.

A first discharge pneumatic pilot valve sensor 40 is secured to the underside of the first discharge gravity roller section 20 and a second discharge pneumatic pilot valve sensor 42 is secured to the underside of the second discharge gravity roller section 24. An infeed pneumatic pilot valve sensor 44 is secured to a flange 46 supported by the air cylinder 32. The sensor 40 is positioned so as to be actuated by a load 48 (FIG. 1, not shown in FIG. 2) on the first discharge gravity roller section 20. The sensor 42 is positioned so as to be actuated by a load (not shown) discharging on the second discharge gravity roller section 24. The sensor 44 is positioned so as to be actuated by a load 49 (FIG. 1, not shown in FIG. 2) on the platform 26. A further load 50 is shown on the infeed gravity roller section 14. The sensor 40 is connected to a three port shuttle valve 51 by an air hose 52 and the sensor 42 is also connected to the three port shuttle valve 51 by an air hose (not shown). The three port shuttle valve 51 is connected to a five port valve 53 by an air hose 54 and the sensor 44 is connected to the five port valve 53 by an air hose 55. Air hoses 56 and 57 lead from the five port valve 53 to ports 58 and 59 respectively on the air cylinder 32. Compressed air is supplied to the five port valve 53 and to the sensor valves 40, 42 and 44 through an air filter and lubricator 60 by an air hose (not shown).

The means for tilting the platform 26 to ensure discharge of a load to the second discharge gravity roller section 24 comprises a rigid rod 61 pivotably attached to a flange 62 extending from the skirt 39. The other end of the rigid rod 61 carries a retaining collar 63, and the rigid rod 61 in a part intermediate between the flange 62 and the collar 63 extends through a fixed bearing 64. A block 65 is movable on a pneumatic ram 47 extending from and reciprocable in a cylinder 45. In the position shown in broken lines, the block 65 effectively enlarges the bearing 64. In the withdrawn position the block 65 is clear of movement of the collar 63. A switch (not shown) operates the pneumatic ram 47 and the cylinder 45 to extend and retract the block 65.

In operation, assuming the platform 26 to be in its infeed position, the load 49, having just run on to the platform 26, actuates the sensor 44. The signal therefrom would normally allow the five port valve 53 to supply air to the port 59 on the cylinder 32, and the pressure of the air supplied would cause the ram 28 to rise lifting the platform 26 and the load 49. In this case, however, the sensor 40 is still actuated by the previous load 48, which has backed-up on the first discharge gravity roller section 20, and the signal from the sensor 40 prevents the platform from rising. When the back-up on the first discharge gravity roller section 20 has been cleared, and the load 48 no longer actuates the sensor 40, the platform 26 and the load 49 rise to the full extent of the ram 28. The next load 50 runs down the infeed gravity roller section 14 but is prevented from feeding into the elevator 12 by the skirt 39 which is rising with the platform 26. The inclination of the platform 26 at the full extent of the ram 18 will depend upon whether the block 65 was extended or retracted during the rise. If the block 65 was retracted, that is in the position shown in full lines, the collar 63 of the rigid rod 61 will not have struck the bearing 64 and there will be no force acting to compress the spring 36. The inclination of the platform 26 will then be the same as that of the first discharge gravity roller section 20. On the other hand, if the block 65 was extended, that is in the position shown in broken lines, the collar 63 of the rigid rod 61 will have struck the block 65, which effectively has enlarged the bearing 64, before the ram 28 is fully extended. Then the platform 26 will have been subject to a continuing upward force from the ram 18 and simultaneously a restraining force from the rigid rod 61 which could rise no further. These two forces result in the platform being inclined at the same angle as the second discharge gravity roller section 24.

The load 48 rolls off the platform 26 onto either the first or the second discharge gravity roller section 20 or 24 as explained above, and actuates the sensor 40 or 42 as appropriate, by which time it is sufficiently discharged from the platform 26 not to topple back when the platform 26 is lowered. A signal from the actuated sensor 40 or 42 to the five port valve 53 allows air to be supplied to the port 58 of the cylinder 32 and the platform 26 is lowered to the infeed position, where it is inclined at the same angle as the infeed gravity roller section 14 as any restraint upon the spring 36 has been removed.

Figure 3:
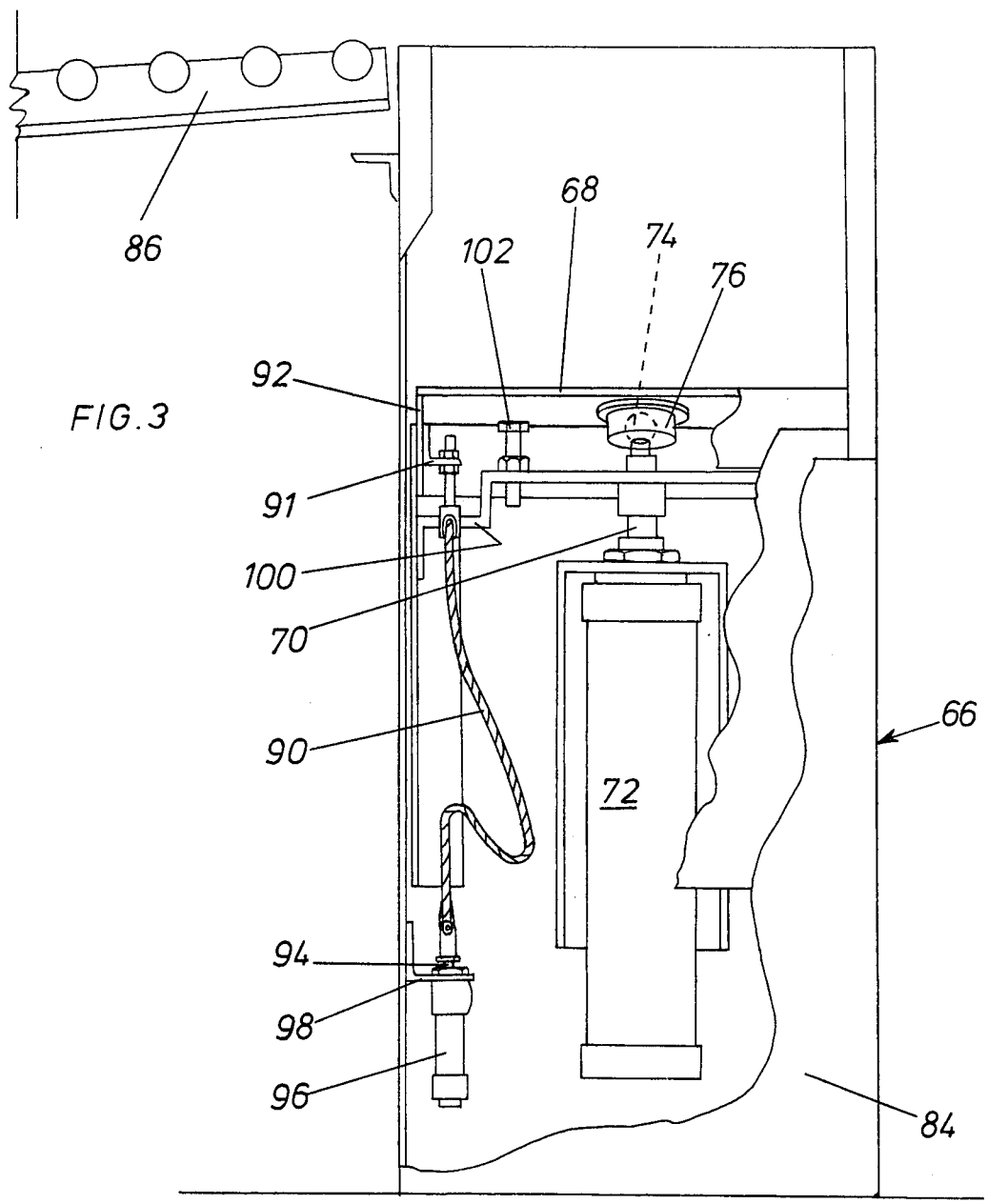
FIG. 3 is a partially sectional end elevation of a further elevator according to the invention with several parts omitted for the sake of clarity, and shows a first discharge gravity roller section, infeed and second discharge roller sections not being shown for the sake of clarity.
Figure 4:
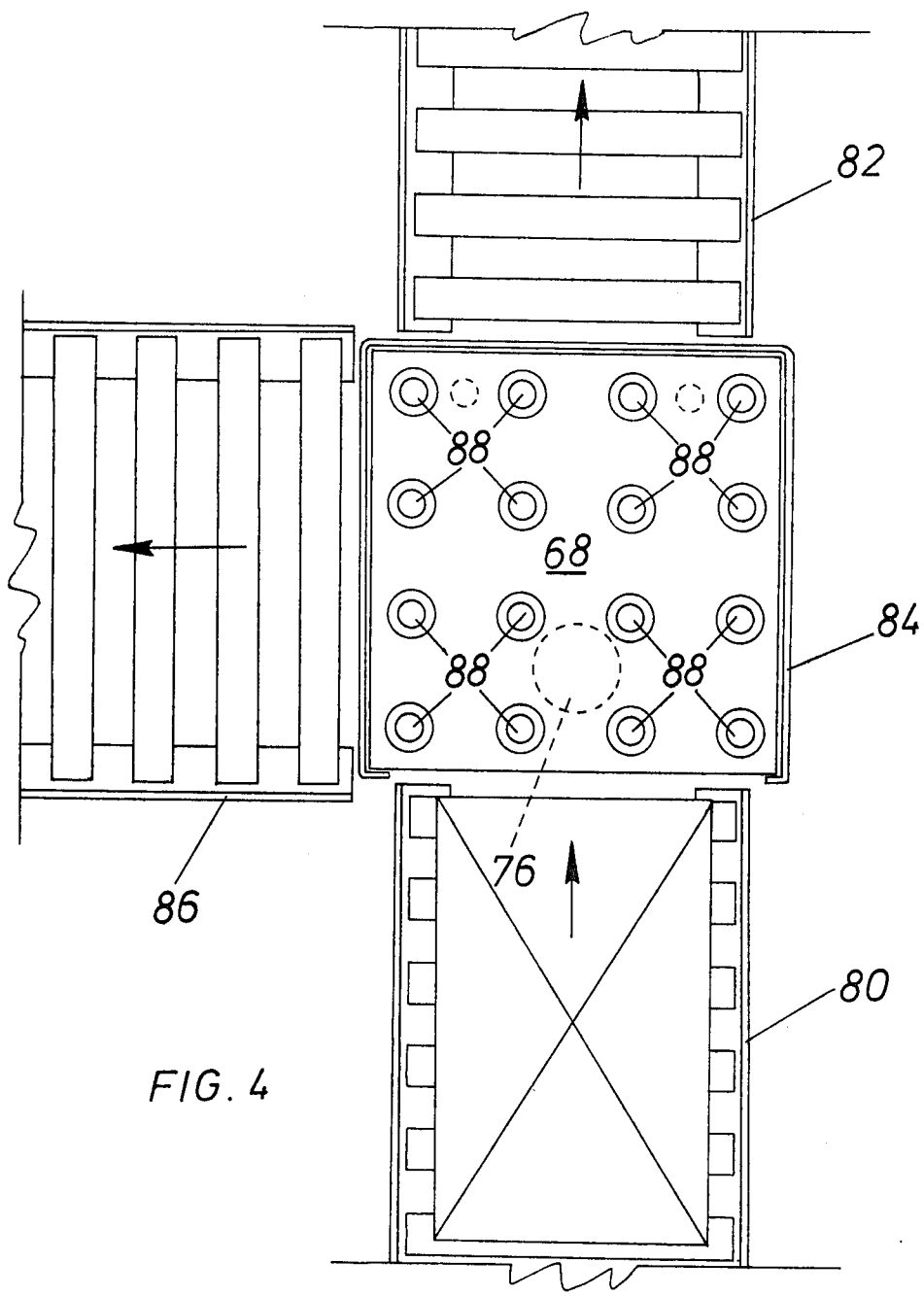
FIG. 4 is a plan view of the elevator and gravity rollers sections of FIG. 3.

The FIGS. 3 and 4 show an elevator 66 having an inclinable platform 68. A pneumatic ram 70, reciprocable in a cylinder 72, carries a ball 74 which cooperates with a ball socket 76 mounted on the underside of the platform 68. The action of gravity ensures that the stable angle of inclination to the horizontal is that of an infeed gravity roller section 80 and a discharge gravity roller section 82. Both gravity roller sections 80 and 82 are attached to a housing 84 by means similar to those described for the gravity roller sections 32 and 36 of the previous embodiment. The housing 84 is of the same extent as that of the housing 28 of the elevator 12.

A discharge gravity roller section 86 is attached to the housing 84 in a similar manner. A low friction surface is provided on the platform by a plurality of ball castors 88.

The means for tilting the platform to ensure discharge of a load to the discharge gravity roller section 86 comprises an anchor cord 90 attached to a flange 91 extending from a casing 92 dependent from the platform 68. The other end of the anchor cord 90 is attached to a small pneumatic ram 94 reciprocable in a cylinder 96 rigidly attached to a flange 98 extending from the housing 84 of the elevator 66. The anchor cord 90 passes through a bridge 100 carried by the pneumatic ram 70 and bearing a stop 102 and another stop shown in broken lines in FIG. 4. The sides of the casing 92 are set slightly in from the body to allow the platform 68 to tilt and the bridge 100 is not attached to the casing 92. A switch (not shown) operates the penumatic ram 94 and cylinder 96 to extend and retract the ram 94.

Operation to discharge a load along the discharge gravity roller section 82 is as in the previous embodiment, the ram 94 being extended. To discharge a load along the discharge gravity roller section 86, the ram 94 is withdrawn shortening the effective length of the anchor cord 90. The anchor cord 90 then becomes taut when the platform 68 rises and applies a force thereto causing tilting to the desired direction about the ball 74/socket 76 point. The stop 102:1) at the lower (infeed) position supports the platform together with the other stop and the ball; and 2) at the upper (discharge) position provides a fulcrum together with the ball about which the platform may be tilted from its normal 3 point suspension by the anchor cord. Any number of loads may be discharged successively to the discharge gravity roller section 86 without needing to withdraw the ram 94 for each load, for the platform 68 will return to its stable inclination ready for a new load to be fed in each time that it is lowered, regardless of whether the ram is withdrawn or extended.

FIGS. 5 to 10 show a few of the uses for elevators according to the invention. In FIG. 5, a length of gravity roller section 104 extends from a point of height $x$ to the infeed position of an elevator 106 and a length of gravity roller section 108 extends from the discharge position of the elevator 106 to another point of height x. This arrangement enables loads to be transported on a gravity roller conveyor between two points of the same height. If a stop is placed on the end of the gravity roller section 108, loads will accumulate along that section.

FIG. 6 is a similar arrangement having an infeed gravity roller section 110, a fixed angle platform elevator 112 and discharge gravity roller section 114. The lift given by the elevator 112 to a load is sufficient to enable loads to be transported on a gravity roller conveyor between a first point and a second point of greater height than the first point.

Figure 7:
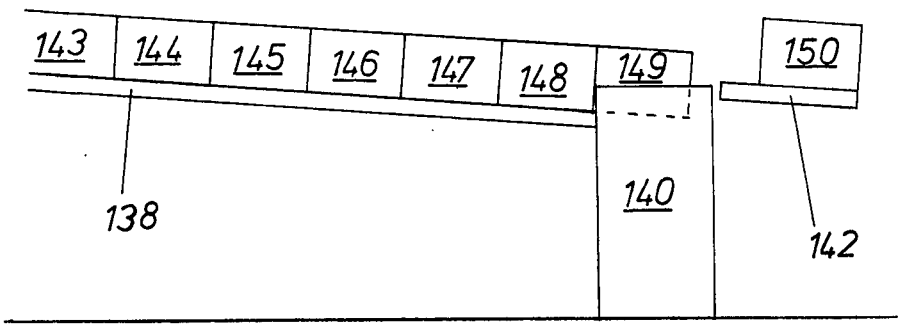

FIG. 7 shows a number of loads 143-149 accumulated on a gravity roller section 138 feeding into an elevator 140. This lifts the loads one at a time for the separate feeding of work on a gravity roller conveyor 142 to a machine (not shown). A load 150 is about to enter the machine.

Figure 8:
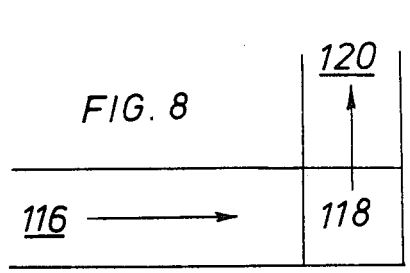
FIGS. 8–10 show a diagrammatic plan view of conveyor sections.
Figure 9:
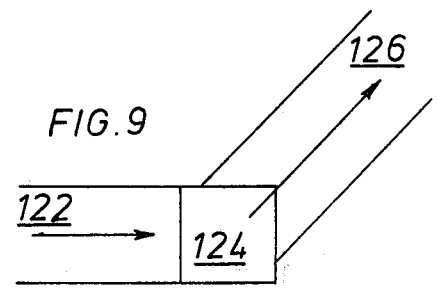

FIG. 8 shows infeed and discharge gravity roller sections 116 and 120 respectively with an elevator 118 between them, showing how loads may be transported around 90° corners. FIG. 9 is similar, with infeed and discharge gravity roller sections 122 and 126 respectively connected by an inclinable platform elevator 124, and shows how loads may be transported around 45° corners. This invention is applicable to angles of other degrees.

Figure 10:
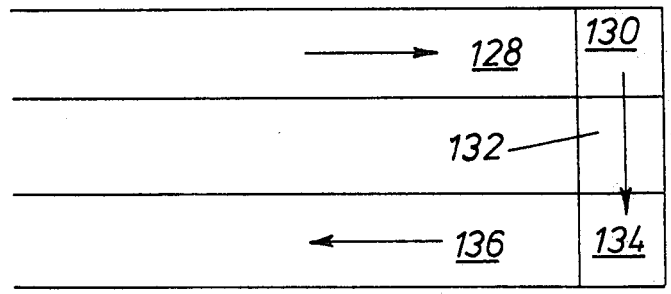

FIG. 10 shows how loads may be transported through 180°, by feeding in from a gravity roller section 128 to an inclinable platform elevator 130 and thence to a gravity roller section 132. This is in turn feeds the load into a second inclinable platform elevator 134, and thence to a gravity roller section 136.

FIG. 11 shows an elevating and lowering means 152 which comprises two pneumatically operable rams 154 linked by a crossplate 156. The cross-plate 156 carries a third pneumatically operable ram 158, to the top 160 whereof a platform (not shown) may be attached. When the rams 154 are extended the cross-plate 156 will be elevated, raising bodily the ram 158 and therefore raising the platform (not shown) attached to the top 160 thereof. The ram 158 may then be extended, further raising the platform (not shown). The position with the rams 154 and 158 extended is shown in phantom lines; an elevation is obtained which, if a single ram had been used would have necessitated countersinking that ram in the floor.

An alternative elevating and lowering means 161 shown in FIG. 12 comprises a first ram 162 attached to a platform 164 shown in the feed position. The platform 164 which is only to discharge to another platform, as hereinafter described, need only be a fixed angle platform without a tilting mechanism.

Dependent from the platform 164 is a skirt 166 for preventing a load (not shown) from feeding into the elevating and lowering means 161 from a gravity roller section 167 when the platform 164 is raised. A plate 168 prevents a load (not shown) on the platform from discharging other than at the discharge position. At the discharge position the load (not shown) will discharge onto a platform 169 which may be elevated by a second ram 170. A housing 172 prevents the load from discharging until it reaches the discharge position, where it may pass onto a gravity roller section 174.

FIG. 13 shows a double platform 176, having rollers 178 mounted in the infeed direction, that is the direction of a gravity roller section 180, on an upper part thereof and wheels 182 mounted at right angles to the rollers on a lower part thereof.

Discharge gravity roller sections 184, 186 and 188 are shown, and the double platform 176 is constructed such that the rollers 178 will be uppermost when a load is to be discharged to the gravity roller section 188 and the wheels 182 will be uppermost when a load is to be discharged to the gravity roller section 184 or the gravity roller section 186. Details of this construction are shown in FIGS. 14 and 15.

The double platform 176 has an upper part 190 and a lower part 192. The upper part 190 carries rollers 178 each mounted on a spindle (not shown) fitted into holes in two opposite side walls (not shown) of the upper part 190 of the double platform 176. Dependent from the upper part 190 of the double platform 176 is a skirt 194, which is the means for preventing a load from running into the elevator when the double platform 176 is not at the infeed position. The skirt 194 carries a flange 196 and a stop 198 and a similar flange 200 and stop 202 are carried by a plate 203 dependent from the upper part 190 of the double platform 176 opposite the skirt 194. To each of the flanges 194 and 200 is attached one end of a spring 204 and 206 respectively, and the other ends of the springs 204 and 206 are attached to the lower part 192 of the double platform 176. On this lower part 192, upstanding flanges 208 mount spindles 210 which carry the wheels 182. The stops 198 and 202 prevent the weight of the lower part 192 from stretching the springs 204 and 206 to such an extent that they are permanently deformed.

Figure 14:
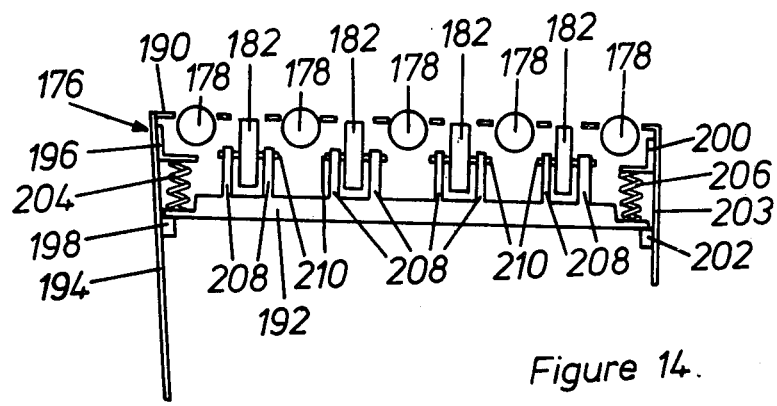
FIGS. 14 and 15 are sectional side elevations, in the uncompressed and compressed conditions respectively, of the double platform used in the elevator of FIG. 13.
Figure 15:
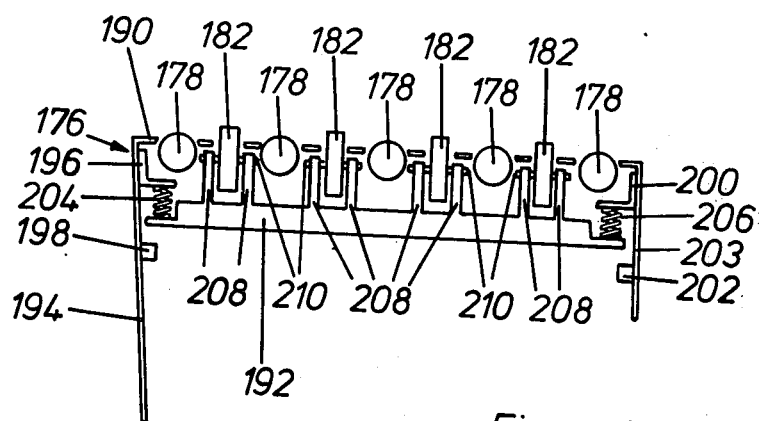

With the springs 204 and 206 uncompressed and the lower part 192 resting on the stops 198 and 202, as shown in FIG. 14, the rollers 178 are uppermost. With the springs 204 and 206 compressed, as shown in FIG. 15, the wheels 182 extend through gaps between the rollers 178 and are therefore uppermost.

The operation of such double platforms is shown by FIGS. 16 and 17. In both these Figures, the pneumatic circuitry, sensors, loads, and means of attachment of the gravity roller sections are not illustrated for reasons of clarity. It is to be understood that these parts are as shown in FIG. 1, and that there are in fact three gravity roller sections, the third being hidden behind the elevator, also in FIG. 1. Also in FIG. 16 the cylinder and the ram mounting the block which is used effectively to enlarge the bearing is not shown, but is as in FIG. 1, except duplicated as there are two bearings.

In FIG. 16, a double platform the same as that shown in FIGS. 14 and 15, except for the omission of the stops 198 and 202, and bearing the same reference numerals for the same parts, is mounted by a ball and socket joint 212 on a pneumatic ram 214 of an air cylinder 216. The pneumatic ram 214 also carries a plate 218 to which the lower part 192 of the double platform 176 is connected by a spring 220. The stable inclination of the double platform 176 is that of an infeed gravity roller section 222, and a discharge gravity roller section 224. The means for tilting the double platform 176 to ensure discharge of a load to the hidden gravity roller section comprises rigid rods 226 pivotally attached to flanges 228 extending from the skirt 194 and the plate 203. The tops of the flanges 228 serve the same function as the stops 198 and 202. The other ends of the rigid rods 226 carry retaining collars 230 and the rigid rods 226 in parts intermediate between the flanges 228 and the collars 230 extend through fixed bearings 232.

In operation, assuming the double platform 176 to be in its infeed position, a load runs onto it from the gravity roller section 222 and actuates a sensor on the double platform 176. In the absence of a negating signal from a discharge roller sensor, this causes the ram 214 to extend and raise the double platform 176. If the blocks extending the bearings 232 are not extended, there is no restraint on the double platform 176 which maintains its illustrated inclination. The load then runs onto the gravity roller section 224. If, on the other hand, the blocks are extended, the collars 230 strike the blocks before the ram 214 has fully extended. The ram 214 continues to rise lifting the lower part 192 of the double platform 176 but the upper part is restrained by the rigid rods 226. The double platform 176 therefore compresses so that the wheels 182 become uppermost. Further rising of the ram 226 causes compression of the spring 220 so that the inclination of the double platform 176 is now that of the hidden discharge gravity roller section and, the wheels 182 being uppermost, the load runs onto that section. Return of the double platform 176 to the infeed position will be understood from the discussion of the operation of the embodiment of FIG. 1.

FIG. 17 is similar except in respect of the tilting mechanism, and the same reference numerals are used where applicable. The tilting mechanism comprises anchor cords 234 attached to the flanges 228 and to small pneumatic rams 236 reciprocable in cylinders 238 rigidly attached to a crosspiece 240. The effective length of the anchor cords 234 with the rams 236 extended is sufficient to allow the double platform 176 to rise without restraint and therefore to discharge to the gravity roller section 224. With the rams 236 withdrawn the anchor cords 234 have a shorter effective length, and the same forces act upon the double platform 176 as in the case when the rigid rods 226 of the previous embodiment strike the blocks. These forces have the same effect, i.e. the double platform 176 is placed in a condition to discharge to the hidden gravity roller section.

I claim:

1. An elevator for raising a load from an infeed position to a discharge position which elevator comprises
   a. a platform for supporting the load and adapted in use to be inclined to the horizontal about a first axis at the infeed position and inclined to the horizontal about a second axis at the discharge position, the first and second axes not being parallel,
   b. means for changing the inclination of said platform during its elevation from the infeed position to the discharge position,
   c. a low friction surface on said platform and provided by ball castors,
   d. a pneumatic ram for elevating said platform and said load from the infeed position to the discharge position and for lowering said platform from the discharge position to the infeed position, the pneumatic ram being attached to the platform by the cooperation of a ball carried on said ram and a ball socket on the underside of said platform,
   e. means preventing infeed of a load other than when the platform is in the infeed position, and
   f. means preventing discharge of a load other than when the platform is in the discharge position.

2. An elevator according to claim 1 in which the means preventing infeed of a load other than when the platform is in the infeed position comprises a skirt member elevatable and lowerable with said platform.

3. An elevator according to claim 1 in which the means preventing discharge of a load other than when the platform is in the discharge position comprises a housing extending at least between the infeed position of said platform and the discharge position of said platform.

4. An elevator according to claim 1 in which a first sensor is provided on the platform to prevent said platform from rising until a load is supported on said platform, and a second sensor is provided on a discharge conveyor section associated with said elevator to actuate lowering of said platform when said load has been adequately discharged therefrom.

5. An elevator according to claim 1 in which the means for changing the inclination of the platform during its elevation from the infeed position to the discharge position comprises a rigid rod, one end of which is pivotally attached to the underside of said platform, a fixed bearing through which said rod extends, and a retaining collar mounted on the rod below said fixed bearing, the retaining collar being so positioned on the rod that it strikes the fixed bearing during elevation of the platform.

6. An elevator for raising a load from an infeed position to a discharge position which elevator comprises
   a. a platform for supporting the load, the platform having an upper part on which rollers are mounted in the infeed direction, and a lower part on which wheels are mounted at right angles to the rollers, the upper and lower parts being secured together by springs such that when the springs are uncompressed the rollers provide a first low friction surface and when the springs are compressed the wheels project through the spaced between the rollers and provide a second low friction surface at right angles to the first low friction surface, the platform being adapted in use to be inclined to the horizontal about a first axis at the infeed position and inclined to the horizontal about a second axis at the discharge position, the first and second axes not being parallel,
   b. means for changing the inclination of said platform during its elevation from the infeed position to the discharge position,
   c. a pneumatic ram for elevating said platform and said load from the infeed position to the discharge position and for lowering said platform from the discharge position to the infeed position, the pneumatic ram being attached to the underside of the lower part of the platform by the cooperation of a ball carried on said ram and a ball socket on the underside of the lower part of said platform,
   d. means preventing infeed of a load other than when the platform is in the infeed position, and
   e. means preventing discharge of a load other than when the platform is in the discharge position.

7. An elevator according to claim 6 in which the means for changing the inclination of the platform during its elevation from the infeed position to the discharge position comprises a cord, one end of which is attached to the underside of the upper part of said platform and the other end of which is attached to an anchor point, the cord having a length such that said cord becomes taut during elevation of the platform.

8. An elevator according to claim 7 in which the means for changing the inclination of the platform during its elevation from the infeed position to the discharge position comprises a rigid rod, one end of which is pivotally attached to the underside of the upper part of said platform, a fixed bearing through which said rod extends, and a retaining collar mounted on the rod below said fixed bearing, the retaining collar being so positioned on the rod that it strikes the fixed bearing during elevation of the platform.

9. An elevator according to claim 1 in which the means for changing the inclination of the platform during its elevation from the infeed position to the discharge position comprises a cord, one end of which is attached to the underside of said platform and the other end of which is attached to the anchor point, the cord having a length such that said cord becomes taut during elevation of the platform.

* * * * *